Patented Sept. 19, 1933

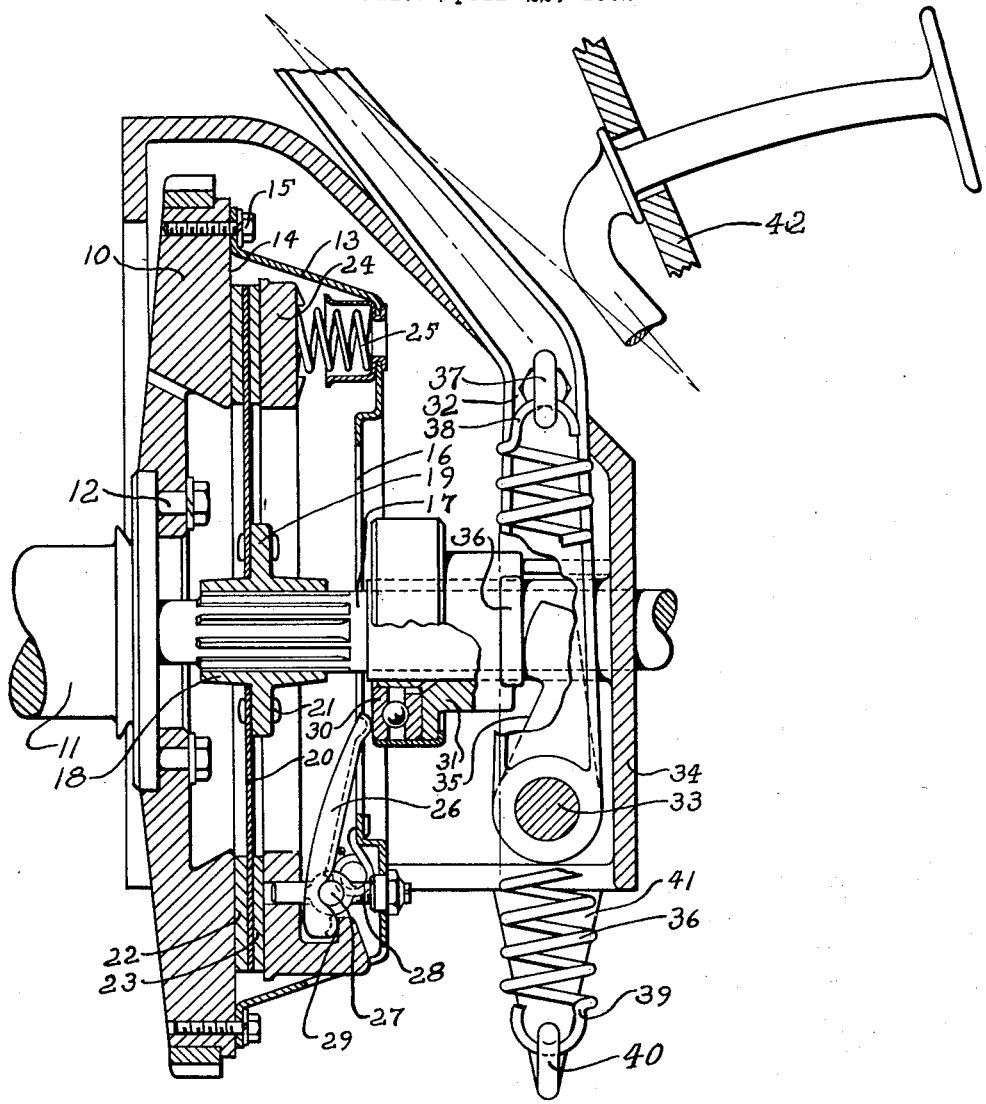

1,927,643

UNITED STATES PATENT OFFICE 1,927,643

CLUTCH BOOSTER

James W. Hughes, Detroit, Mich., assignor to Chrysler Corporation, Detroit, Mich., a corporation of Delaware Application April 22, 1932. Serial No. 606,881

1 Claim. (Cl. 192—99)

This invention relates to improved clutch mechanism and particularly to a device for assisting in the actuation of the operating member of a clutch of the type used in vehicles.

In clutches of this character it is desirable to have the friction elements of the driving clutch discs held against the driven clutch member with substantial pressure when the clutch is in an engaged condition, and for this purpose springs are provided which normally tend to maintain the clutch in an engaged position. In order to disengage the clutch, the force exerted by these springs must be overcome either by the foot pressure of an operator or by power operated mechanism. In either case, the strength of the clutch springs and accordingly the pressure with which the friction elements are held against the driven clutch member is limited by the minimum force which it is desired to have the clutch disengaging mechanism respond to.

The main objects of the invention are to provide means for relieving the operator of a portion of the foot pressure required to disengage the clutch of a vehicle; to provide means of this character which do not oppose the action of the clutch springs or otherwise reduce the pressure with which the friction clutch elements are held in contact with the driven clutch member when the clutch is in an engaged position; to provide simple and inexpensive means for assisting in depressing the clutch pedal which is substantially ineffective when the pedal is fully released and which becomes increasingly more effective as the clutch pedal is depressed further and further toward its fully depressed position.

An illustrative embodiment of the invention is shown in the accompanying drawing, in which:

The figure is a vertical sectional view of a clutch and clutch disengaging apparatus showing my improved means for assisting in the actuation of the clutch operating member.

The clutch illustrated in the drawing is of the type conventionally used in vehicles and it includes a driven clutch member 10 which in conventional devices of this character constitutes the flywheel of an engine. The member 10 is carried by and non-rotatably secured to the rear end of a crankshaft 11 by bolts 12. A sheet metal casing 13 is rigidly secured to the side face 14 of the driven clutch element by bolts 15. This casing is provided with a central opening 16 through which a shaft 17 extends. Splined on the shaft 17 is a collar 18 which has a radially extending flange 19. A clutch disc 20 is rigidly fixed to the flange 19 by rivets 21 and is provided on its respectively opposite sides with ring-shaped friction elements 22 and 23. The friction ring 22 registers with the side face 14 of the driven clutch element. An axially shiftable pressure ring 24, slidably mounted within the casing 13 in concentric relation to the driven shaft 17, is yieldably urged against the face of the other friction ring 23 by a plurality of circumferentially arranged coil springs 25, one of which is disclosed.

The coil springs 25 are relied upon to normally retain the clutch in an engaged condition and it is desirable to employ springs of substantial compressive strength so as to assure unitary rotation of the driving and driven members of the clutch. The effective area of the friction rings and the strength of the spring must be proportioned to obtain a desired frictional opposition to relative rotation of the driving and driven clutch members. A substantial saving in the material embodied in a clutch and conservation of the space which the clutch mechanism of a vehicle consumes may be effected by employing springs of comparatively large compressive strength so as to permit reduction in the effective area of the friction rings and in the dimensions of all of the parts of the clutch.

The compression of the clutch springs 25 must, however, be overcome by the foot pressure of an operator or by power actuated mechanism in order to shift the pressure ring to the left, as viewed in the figure, so as to disengage the clutch, and for this reason the magnitude of the foot pressure, or other force which it is desired to have the clutch ring respond to, limits the extent to which the strength of the springs 25 may be increased.

The clutch disengaging apparatus by which the pressure ring is retracted includes a plurality of clutch disengaging fingers 26, each of which is journaled on bosses 27 extending laterally from the sides of a bolt 28 that is carried by the casing 13 and pressure ring 24. The outer ends of the fingers 26 bear against a shoulder 29 formed on the pressure ring and the inner ends of these fingers bear against a ring-shaped rotatable bearing element 30 on a collar 31 which is shiftably mounted on the shaft 17. The collar 31 may be shifted forwardly to the left, as viewed in the figure, by depression of a clutch pedal 32 which is fixed to a shaft 33 journaled in apertures in the clutch housing 34 and having a rigidly attached clutch releasing fork 35 which engages flanges 36 on the rear end of the collar 31. This movement of the collar rotates the clutch disengaging fingers 26 in a counter-clockwise direction, retracting the pressure ring 24 against the action of the springs 25.

A coil spring 36 is attached at one end to the pedal 32 at a location above the shaft 33 by an I-bolt 37 in which a hooked extremity 38 of the spring is received. The other end of the spring 36 is provided with a hooked extremity 39 which is received in the apertures of an eye 40 on the lower end of a bracket 41 that is either rigidly fixed to, or formed integral with the clutch housing 34. The eye 40 of the bracket 41 is located so as to be in substantially vertical alignment with the I-bolt 37 of the pedal and with the axis of the shaft 33 when the pedal is in its fully released position and the spring is calibrated so as to be under substantial tension when the pedal is in this position. Under these conditions, a substantially dead center relation exists between the axis of the shaft 33 and the opposite ends of the spring 36 and the full force of the spring is applied vertically upon the shaft 33 and therefore the spring has substantially no rotating effect upon the pedal. Initial depression of the pedal, however, either by foot pressure or by power actuating mechanism, upsets the dead center relation of the ends of the spring with respect to the axis of the shaft 33 and permits the tension of the spring to urge the pedal 32 in a counter-clockwise direction toward its depressed position. The effect of the tension of the spring upon the pedal is increased as the pedal moves further and further toward its fully depressed position due to the increased magnitude of the horizontal component of the force of tension of the spring. In this manner the assistance of the spring 36 in depression of the pedal increases as the opposition to depression of the pedal by compression of the clutch springs 25 increases.

The spring 35 is preferably calibrated so that it will at no time independently overcome the force of the clutch springs 25 and therefore when the foot pressure or pressure derived in any other manner is removed from the pedal, the springs 25 acting through the fingers 26, collar 31, fork 35, and the shaft 33, return the pedal to the position shown in the drawing where it is held against further clockwise movement by engagement with the toe board 42 of a vehicle or with a suitably located stop (not shown). When a clutch is equipped with means of this character for assisting in the depression of the pedal the strength of the spring 25 may be increased and the dimensions of the clutch parts, including the clutch disc, may be materially reduced by properly predetermining the strength of the spring 36 without excessively raising the magnitude of the foot pressure or the force required of power actuating mechanism in order to disengage the clutch.

Although but one specific embodiment of the invention is herein shown and described, it will be understood that various changes in the size, shape, and arrangement of parts may be made without departing from the spirit of my invention and it is not my intention to limit its scope other than by the terms of the appended claim.

What I claim is:

In clutch mechanism, a support, clutch disengaging apparatus having an operating pedal pivotally mounted on said support, attachment elements on said support and pedal respectively substantially in alignment with the pivotal axis of said pedal when the latter is in a predetermined clutch engaging position, a spring under tension attached to said elements for assisting in the depression of said pedal after initial movement thereof from its clutch engaging position, and means for holding said pedal against movement in one direction beyond said predetermined position so as to retain said attachment elements in alignment with said pivotal axis and to retain said spring ineffective as a pedal depressing agency when said pedal is in its clutch disengaging position.

JAMES W. HUGHES.